United States Patent [19]

Ferrieu et al.

[11] 4,454,384
[45] Jun. 12, 1984

[54] HANDS FREE TELEPHONE WITH SWITCHABLE GAIN IN THE TWO SPEECH SIGNAL PATHS

[75] Inventors: Gilbert M. M. Ferrieu, Bievres; Yves J. F. Hetet; Jacques Y. Balch, both of Lannion, all of France

[73] Assignee: Telecommunications Radioelectriques et Telephoniques T.R.T., Paris, France

[21] Appl. No.: 376,888

[22] Filed: May 10, 1982

[30] Foreign Application Priority Data

Oct. 12, 1981 [FR] France ............... 81 19155

[51] Int. Cl.$^3$ .................. H04M 9/08; H04R 3/02
[52] U.S. Cl. .................... 179/81 B; 381/93; 330/151
[58] Field of Search ............. 179/1 FS, 1 HF, 1 VL, 179/81 A, 81 B, 100 L; 330/151; 381/83, 93, 107, 108

[56] References Cited

U.S. PATENT DOCUMENTS

| | | | |
|---|---|---|---|
| 3,825,843 | 7/1974 | Felsberg | 330/151 X |
| 4,064,462 | 12/1977 | Goghler et al. | 330/151 X |
| 4,081,620 | 3/1978 | Goodman et al. | 179/1 VL X |
| 4,081,622 | 3/1978 | Clark et al. | 179/81 B |
| 4,382,398 | 5/1983 | O'Neill | 179/1 FS X |

FOREIGN PATENT DOCUMENTS

EP65335 11/1982 European Pat. Off. .......... 179/1 FS
2216111 10/1973 Fed. Rep. of Germany ...... 330/151

Primary Examiner—A. D. Pellinen
Assistant Examiner—Keith E. George
Attorney, Agent, or Firm—Thomas A. Briody; William j. Streeter

[57] ABSTRACT

"Hands free" telephone sets in which there is connected in parallel with the terminals (A) and (B) of a first path ($C_1$) comprising the coupling circuit of the telephone set in series with a controllable amplifier (11) of the receiving path (6), a second path ($C_2$) comprising a controllable amplifier (12) which is controlled by a linear regulator (13) which keeps its output signal constant. The gains of the two amplifiers (11) and (12) respond to each other. A device is provided so as to ensure that the gain in the second path remains higher than the gain in the first path. A third controllable amplifier (5) is provided between the microphone (4) and the input terminal (A) which is used in common by the first and second paths; the said means (14) are adjusted in such a way that the electro-acoustic loop which is closed by the second path ($C_2$) is permanently the source of non-annoying oscillations. By inducing a gain variation of the second amplifier (6) a gain variation in the opposite sense is produced in the receiving path, it being possible for these two variations to have accurately the same amplitudes.

5 Claims, 2 Drawing Figures

HANDS FREE TELEPHONE WITH SWITCHABLE GAIN IN THE TWO SPEECH SIGNAL PATHS

BACKGROUND OF THE INVENTION

The invention relates to a "hands free" telephone set in which, between a terminal of the transmission path and a terminal of the receiving path a first path is formed, which comprises at least the coupling circuit leading to the subscriber line and a variable-gain amplifier, a second path being connected between the two terminals of the first path and comprising at least a second variable-gain amplifier which is controlled by a linear regulator so as to keep its output signal constant as a function of its input signal, the gain of the said amplifier of the first path being responsive to the gain of the said amplifier of the second path, amplifier and/or attenuation means being provided in the one and/or the other path to ensure that the gain in the second path remains higher than the gain in the first path in the frequency band where the loop oscillations may be produced.

In such a telephone set disclosed in Applicants copending application Ser. No. 372,430, filed Apr. 28, 1982 sustained amplitude oscillations which are controlled by the linear regulator so as to render them non-annoying and in particular inaudible are produced in the loop which comprises the acoustic path between the loudspeaker and the microphone of the set and which is closed by the said second path; at the same time annoying sustained oscillations, usually referred to as Larsen oscillations are prevented from being produced in the electro-acoustic loop which is closed by the first path and comprises the coupling circuit of the set, as a result of imperfections in this coupling circuit or as the result of an acoustic coupling in the remote subscriber set.

In other types of "hands free" telephone sets, for example the set described in U.S. Pat. No. 4,162,374 there is used, to prevent the annoying Larsen oscillations from being produced, a different procedure which employs the gain change-over by speech and in general requires a detection of the speech signals in the transmission path and in the receiving path of the set to determine in which path the speech signal is stronger; a gain increase control is effected in this path and a gain decrease control is effected in the other path, these two gain variations being complementary so as to ensure that the total gain in the loop where the Larsen oscillations are liable to be produced remains less than unity.

Although the system described in the above-mentioned patent application Ser. No. 372,430 does not employ the gain change-over by speech in order to avoid the annoying Larsen oscillations; it may be useful for other reasons to effect a gain change-over manually or controlled by the speech. For example when the "hands free" set is used in a very noisy environment it may be important to increase the gain in the receiving link in order to increase the listening comfort, and to decrease the gain in the transmission link, even if this would mean that a speaker must speak louder or closer to the microphone. This gain change-over may be initiated manually or directly controlled by the speech. In this second assumption, when a speaker does not speak into the "hands free" set, the gain in the receiving link must be increased, which increases the listening comfort and the gain in the transmission link must be decreased, which avoids that the other speaker hears at a comparatively loud level the ambient noise in the environment where the "hands free" set is situated. If in contrast therewith, when the speaker speaks into the "hands free" set the gain in the transmission and receiving links must again have their nominal values.

The system disclosed in the patent application Ser. No. 372,430 now renders it unexpectedly possible to provide an extremely simple means to effect these gain change-overs.

SUMMARY OF THE INVENTION

According to a first alternative of the invention, if the variable-gain amplifier of the first path is provided in the receiving path, a third variable gain amplifier is arranged in the transmission path between the microphone and the input terminal which the first and second paths have in common, the said amplifier and/or attenuator means are adjusted in such a manner that the electro-acoustic loop which is closed by the second path is the permanent source of non-annoying low-amplitude oscillations, a variation induced in the gain of the said third amplifier causing a gain variation in the opposite sense in the receiving path.

If the variable gain amplifiers of the first and the second paths are identical and are controlled by the same signal, accurately complementary variations are obtained in the transmission and receiving paths, by only controlling a variation of the gain of the second amplifier in the transmission path.

In accordance with a further alternative of the invention, if the variable-gain amplifier of the first path is provided in the transmission path, the third variable-gain amplifier is arranged in the receiving path between the output terminal which the first and second paths have in common and the loudspeaker. Under the same conditions as in the first alternative it is now possible to obtain accurately complementary gain variations in the transmission path and in the receiving path by controlling only a variation of the gain of the third amplifier in the receiving path.

In the two alternatives of the invention it is possible to effect an automatic change-over of the gain in the two paths by using a speech signal detector of the microphone, for controlling the gain variation of the third amplifier.

To simplify the detailed description of the invention, the following description will be based on the first alternative, that is to say substantially the case in which the variable-gain amplifier of the first path is provided in the receiving path and the third variable-gain amplifier is provided in the transmission path, in the positions indicated above. On the basis of this description the changes to be effected to obtain the second alternative will not be difficult for a person skilled in the art.

BRIEF FIGURE DESCRIPTION

The following description, given by way of non-limitative example with reference to the accompanying drawings will make it better understood how the invention can be put into effect.

DETAILED DISCLOSURE OF THE INVENTION

Figure 1:
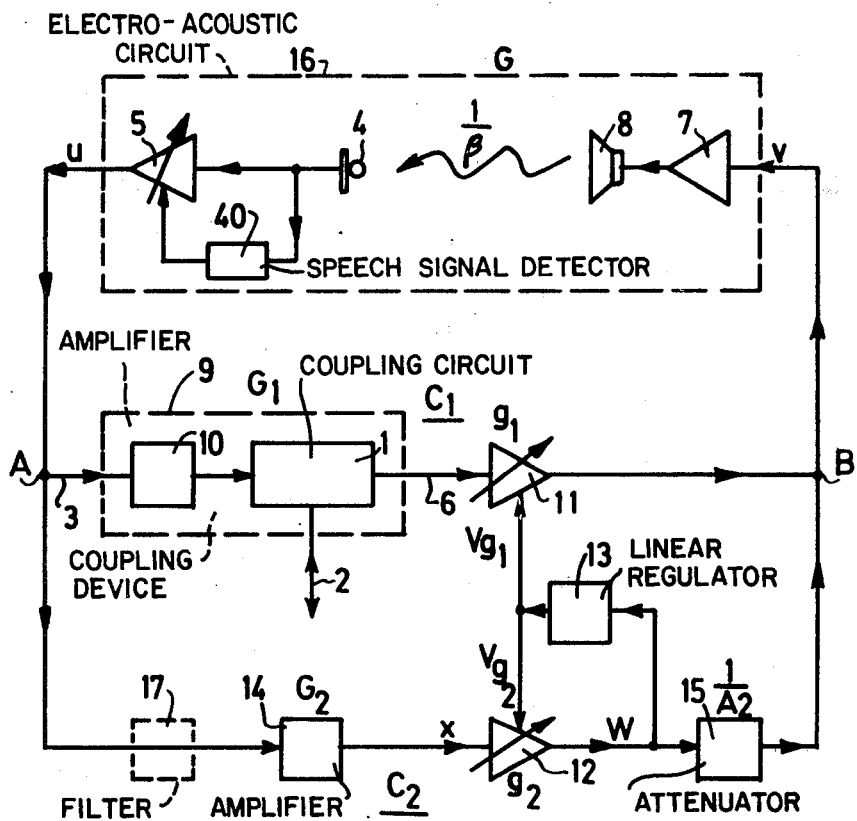
FIG. 1 shows a circuit diagram of the "hands free" telephone set in accordance with the invention.

In the "hands free" telephone set of FIG. 1 the coupling circuit 1 is shown, which couples the telephone line 2 to the transmission path 3 of the set comprising the microphone 4 and a microphone amplifier 5, and also to the receiving path 6 of the set comprising the listening amplifier 7 and the loudspeaker 8. Between the loudspeaker and the microphone there is a certain amount of acoustic coupling characterized by a coupling coefficient $(1/\beta)<1$, $\beta$ being the attenuation of the acoustic power which is transmitted by the loudspeaker and is conveyed to the microphone.

Owing to inevitable imperfections in the coupling circuit 1 and/or owing to an acoustic coupling in the remote telephone set a part of the signal appearing in the transmission path 3 and coming from the microphone 4 is found in the receiving path 6. Whatever the origin of the unwanted coupling between the transmission path and the receiving path of the set, it is possible to establish a device 9 arranged between these two parts and having a defined gain $G_1$ as the standard of the ratio between the signal appearing on the transmission path 3 and the resulting signal appearing on the receiving path 6. No change is made to the generality of the definition of said device 9 if an amplifier 10 is arranged in series with the coupling circuit 1, the gain $G_1$ then including the gain of said amplifier 10.

The acoustic coupling between the loudspeaker 8 and the microphone 4 and the unwanted coupling produced by the coupling circuit 1 between the transmission path 3 and the receiving path 6 of the telephone set forms an electro-acoustic loop in which oscillations may come into being if the gain of the loop is equal to or higher than unity. The frequency of these oscillations is not known and is situated in the passband of the components which are included in the loop and these oscillations have a high amplitude which is only limited by the saturation of the components of the loop.

Figure 2:
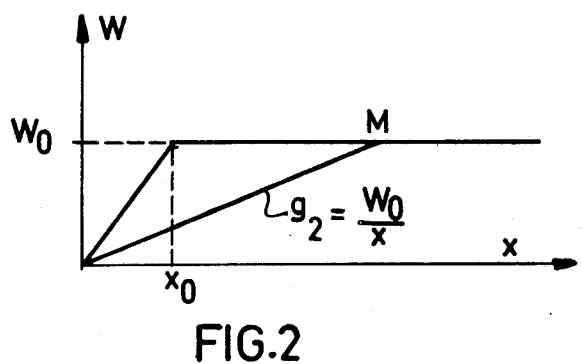
FIG. 2 shows the characteristic of the linear regulator employed in this set.

In order to avoid these unwanted Larsen oscillations, which render the use of the telephone set substantially impossible, the patent application Ser. No. 372,430 proposes the use of the device described hereafter. An amplifier 11 having a variable gain $g_1$ is arranged in the receiving path 6 of the telephone set. Connected to terminals A and B of a first path $C_1$ incorporating the device 9 and the variable-gain amplifier 11 there is a second path which incorporates a cascade arrangement of an amplifier 14 having a gain $G_2$, an amplifier 12 having a variable gain $g_2$ and an attenuator circuit 15 having a gain $(1/A_2)$. The gain $g_2$ of the amplifier 12 controlled by the linear regulator 13 which receives the output signal W of the amplifier 12 and which produces a gain-control signal $V_{g2}$ in such a way that the level of the said output signal W is kept constant beyond a certain value of its input signal x. FIG. 2 shows the characteristic of the output signal W as a function of the input signal x of the amplifier 12 which is so controlled. Up to a value $x_o$ of the input signal x the output signal W remains constant and equal to a value $W_o$. For a value $x>x_o$, the operating point of the amplifier establishes itself at M and the gain of the amplifier $g_2=W_o/x$ decreases when x increases.

The amplifier 11 in the first path $C_1$ is controlled by a gain-controlled signal $v_{g1}$ supplied by the regulator 13 in such a way that its gain $g_1$ responds to the gain $g_2$ of the amplifier 12 of the second path $C_2$. At all instants the gain $g_1$ of the amplifier 11 is then proportional to the gain $g_2$ of the amplifier 12. If these two amplifiers 11 and 12 are of the same construction, the two control signals $V_{g1}$ and $V_{g2}$ may be equal and may be obtained from the same output of the regulator 13 as shown in FIG. 1; in this case the gains $g_1$ and $g_2$ are equal at every instant.

To prevent annoying Larsen oscillations from being produced, the above-mentioned patent application Ser. No. 372,430 recommends that the gain in the second path $C_2$ remains superior to the gain in the first path $C_1$ in the overall frequency band where the oscillations are liable to be produced. It will be easy to see that in accordance with FIG. 1 this condition may be written:

$$G_2 \cdot (1/A_2) \cdot g_2 > G_1 \cdot g_1 \tag{1}$$

When the variable gains $g_1$ and $g_2$ remain equal or proportional, if the gain $G_1$ of the device 9 and the gain $1/A_2$ of the attenuator 15 are fixed, this condition (1) can be easily satisfied by adjusting the gain $G_2$ of the amplifier 14.

To demonstrate that it is possible to avoid annoying Larsen oscillations produced by the acoustic coupling between the loudspeaker 8 and the microphone 4, it is advantageous to define the gain G of an electro-acoustic circuit 16 which comprises the loudspeaker 8 and its amplifier 7, the microphone 6 and its amplifier 5 and, finally, the acoustic path between the loudspeaker and the microphone by the coupling coefficient $1/\beta$. This gain G may be defined as the coefficient of the ratio between the signal v applied to the amplifier 7 and the resulting signal u at the output of the amplifier 5.

Sustained oscillations can only come into being in the auxiliary loop formed by the electro-acoustic circuit 16, which is closed by the second path $C_2$ when, in accordance with the condition (1), the gain in this second path $C_2$ remains always higher than the gain in the first path $C_1$. The presence or absence of sustained oscillations in this auxiliary loop depends on the total gain in this loop which may be expressed by the product $G \cdot G_2 \cdot 1/A_2 \cdot g_2$.

There are no oscillations in the auxiliary loop and, all the more so, no oscillations in the main loop formed by the circuit 16, which is closed by the path $C_1$, if the gain in the auxiliary loop is less than unity, that is to say if:

$$G \cdot G_2 \cdot (1/A_2) \cdot g_2 < 1 \tag{2}$$

In practice this is obtained when the acoustic coupling coefficient $1/\beta$ between the microphone and the loudspeaker is weak, since the gain G is proportional to this coefficient $1/\beta$.

If the acoustic coupling coefficient $1/\beta$ increases, the gain G increases and above a predetermined value of this coefficient, that is to say in practice below a certain distance between the microphone and the loudspeaker, the inequality (2) is no longer satisfied. This results in sustained oscillations starting in the auxiliary loop formed by the circuit 16, which is closed by the second path $C_2$. When the oscillating mode has been established an increase in the acoustic coupling coefficient $1/\beta$ produces an increase in the signal x at the input of the amplifier 12; this increase of the signal x produces, due to the presence of regulator 13, a decrease of the gain $g_2$ of the amplifier 12, in such a manner that the amplitude of the oscillations at the output of said amplifier remains limited to the value $W_o$. If the gain $1/A_2$ of the attenuator circuit 15 is chosen sufficiently low, the oscillation signal $W_o/A_2$ which is applied to the electro-acoustic circuit 16 can be sufficiently weak so as to ensure that none of the components of the loop, particularly the amplifiers 5 and 7 operate in the saturated mode, and that the signal is inaudible to a user of the telephone set when listening to the loudspeaker 8. For this oscillating mode the total gain of the auxiliary loop establishes itself at the value 1, that is to say it can be written that:

$$G \cdot G_2 \cdot 1/A_2 \cdot g_2 = 1 \qquad (3)$$

At the same time that a decrease of the gain $g_2$ of the amplifier 11 is produced (in response to an increase of the coupling coefficient $1/\beta$) an equal or proportional decrease of the gain $g_1$ of the amplifier 11 is produced, which renders it possible to satisfy the condition (1) in all circumstances. This condition (1) being satisfied, the total gain in the main loop formed by the circuit 16, which is closed by the first path $C_1$ always remains below unity, so that the first path $C_1$ does not contribute to the occurrence of high-amplitude and annoying Larsen oscillations at the terminal of the electro-acoustic circuit 16. The only oscillations which may be produced at the terminals of the circuit 16 are obtained from the second path $C_2$ in which they are controlled and their amplitude limited so as to ensure that they will not be annoying.

To prevent the speech signals coming from the microphone 4 from passing through the path $C_2$ in which they may disturb the regulation of the amplitude of the oscillations by the regulator 13, it is advantageous to provide a filter 17 having a very narrow passband in the second path $C_2$, before the amplifier 12. This filter is shown by means of a dotted line. The gain $G_2$ then includes the gain of the amplifier 14 and the filter 17. In this manner the gain $G_2$ is selectively increased in the passband of the filter 17 and the oscillations in the auxiliary loop establish themselves substantially at the central frequency of said passband, independent of the acoustic coupling between the loudspeaker and the microphone; at the same time the speech signals in the second path have a very weak level, compared with the loop oscillations and do not substantially disturb the regulation of the amplitude of these oscillations.

The present invention provides a simple means to realize the variations of the complementary gain in the transmission and receiving path of a "hands free" telephone set employing the system described above for avoiding annoying Larsen oscillations.

In the known telephone sets, to obtain the complementary gain variations in these two paths, it is necessary to effect by means of an amplifier of the transmission path a gain variation in one sense and to effect at the same time by means of the amplifier in the receiving path a gain variation of the same amplitude but in the other sense. To effect a change-over of these gains by the speech two speech detectors, whose output signals are used to change-over the gain are often employed.

By means of the present invention it is possible to produce extremely complementary gain variations in the two paths of the telephone set by only controlling the gain of one single amplifier. This amplifier is the amplifier 5 which is now assumed to be a variable-gain amplifier and which is provided in the transmission path between the microphone 4 and the input A which is used in common by the first path $C_1$ and the second path $C_2$. As the telephone set considered here is of the "hands free" type, the microphone 4 and the loudspeaker 8 are at a fixed distance from each other and the acoustic coupling coefficient $1/\beta$ is substantially constant. In these circumstances the gain G of the electro-acoustic circuit 16 does substantially only depend on the variable gain A of the amplifier 5. If, for the minimum value of the gain of the amplifier 5 that is to say the minimum value of the gain G the gain of the elements of the second path $C_2$ is regulated as described already in the foregoing, in such a way that the annoying sustained oscillations are only produced in the auxiliary loop formed by the circuit 16 and the second path, one can rest assured that the annoying oscillations are also produced for all the other values of the gain A of the amplifier 5. For all these values of the gain A the total gain in the auxiliary loop remains equal to unity, which is expressed by the above formula (3).

As the oscillations passing through the circuit 16 have a very small amplitude, the elements of said circuit operate in the linear mode and the gain G of the circuit 16 is substantially proportional to the gain A. When it is assumed that $G = KA$, K being a fixed coefficient, the formula (3) can then be written:

$$K \cdot A \cdot g_2 \cdot G_2 \cdot 1/A_2 = 1 \qquad (4)$$

For the case in which the two amplifiers 11 and 12 having the variable gains $g_1$ and $g_2$ are identical and are controlled by the same signal, it is obtained that $g_1 = g_2$ and the formula (3) can be written as:

$$K \cdot A \cdot g_1 \cdot G_2 \cdot 1/A_2 = 1 \qquad (5)$$

From this it can be deduced that at all the variations induced in the gain A of the amplifier 5 and which amplify the signal from the microphone 4, automatically corresponds to a variation of the same amplitude and of the opposite sense of the gain $g_1$ of the amplifier 11, which amplifies the signal received in the telephone set.

For the case in which the control of the gains $g_1$ and $g_2$ is such that $g_1 = a\, g_2$ it can be easily seen that with each variation of the gain A of the amplifier 5 there corresponds in the receiving path a gain variation of the opposite sense and having an amplitude divided by a.

It should be noted that to obtain gain variations in the opposite sense in the transmission and receiving paths, an amplifier, for example amplifier 5, arranged in the transmission path between the microphone 4 and the input terminal A which is used jointly by the two paths $C_1$ and $C_2$ must be acted upon. A gain variation in an other place in the transmission path, for example a gain variation of the amplifier 10 will not produce any gain variation in the receiving path. Similarly, a gain variation in any arbitrary place in the receiving path, for example a gain variation of the amplifier 11 or 7 will not produce any gain variation in the transmission path.

The gain variation of the amplifier 5 may be effected progressively or suddenly between two gain values. The variation may, for example, be controlled by a speech signal detector 40 to realize automatically "change-over of the speech" in the telephone set. When a subscriber speaks into the microphone 4, his speech detected by the detector 40 serves to control a normal gain of the amplifier 5. This automatically results for amplifier 11 in a gain $g_1$ of a low value and consequently in a weak energizing signal of the loudspeaker 8. When the subscriber stops speaking into the microphone 4 the detector 40 controls a low gain of the amplifier 5. This automatically results for amplifier 11 in a gain $g_1$ of a higher value, which causes a normal energizing signal for the loudspeaker 8. Manual control can of course be provided for the subscriber so as to ensure the best possible listening comfort.

If the second alternative of the invention is used the variable gain amplifier 11 of the first path is arranged in the transmission path 3 of the telephone set and the third variable gain amplifier may be the amplifier 7 arranged between the loudspeaker 8 and the output terminal B which is used jointly by the first and the second paths; for the automatic change-over of the speech the speech signal detector 40 which controls the gain of the amplifier 7 may be used. How the telephone set functions in the case the second alternative of the invention is used can be easily deduced from the above description.

What is claimed is:

1. In a "hands free" telephone set in which a first path is formed between a microphone and a loudspeaker, comprising at least a coupling circuit and a first variable gain amplifier, a second path connected between said microphone and loudspeaker and comprising at least a second variable-gain amplifier controlled by a linear regulator connected to keep the output signal of the second amplifier constant as a function of its input signal, the gain of the said first amplifier being connected to be responsive to the gain of the said second amplifier, signal amplitude modification means being provided in at least one of said paths to ensure that the gain in the second path remains higher than the gain in the first path in the frequency band where loop oscillations may occur, said first and second paths having a common portion the improvement comprising a third variable-gain amplifier connected in said common portion, said signal amplitude modification means being adjusted in such a manner that the electro-acoustic loop closed by the second path permanently comprises a source of low-amplitude gain of the said third amplifier causing a gain variation in the opposite sence in said first amplifier.

2. A telephone set as claimed in claim 1, characterized in that the first and second variable-gain amplifiers are identical and are connected to be controlled in common by said regulator, so that the said gain variation in the opposite sense has the same amplitude as the said induced gain variation of the third amplifier.

3. A telephone set as claimed in any of the claims 1 or 2, comprising a detector for detecting the speech signal generated by the microphone, said detector being connected to control the gain of said third amplifier.

4. The telephone set of claim 1 wherein said common portion is connected to said microphone, whereby said third amplifier receives signals from said microphone to apply to the non-common portions of said first and second paths.

5. The telephone set of claim 4, further comprising detector means connected to receive signals from said microphone for controlling the gain of said third amplifier.

* * * * *